x 10,000  10,000 Å x 10,000  10,000 Å x 10,000  10,000 Å x 10,000  10,000 Å

INVENTOR:
ROBERT P. NIELSEN

United States Patent Office 3,702,259
Patented Nov. 7, 1972

3,702,259
CHEMICAL PRODUCTION OF METALLIC SILVER DEPOSITS
Robert P. Nielsen, Houston, Tex., assignor to Shell Oil Company, New York, N.Y.
Filed Dec. 2, 1970, Ser. No. 94,366
Int. Cl. B01j *11/20*
U.S. Cl. 117—37 R                    10 Claims

ABSTRACT OF THE DISCLOSURE

Deposits of metallic silver are produced on surfaces of solid objects in the form of uniquely uniform, adherent, fine particles by coating the surfaces of the objects with a solution containing a silver salt of a carboxylic acid and certain organic amine solubilizing/reducing agents, such as mixtures of ethylenediamine and ethanolamine. The coated object is then heated to dry the coating and to reduce the silver present in the coating to metallic silver. In one application, this invention is used to chemically produce metallic silver deposits uniformly on interior and exterior surfaces of porous bodies, especially porous refractory catalyst supports. These supported silver products are effective as catalysts for the direct partial oxidation of ethylene to ethylene oxide.

BACKGROUND OF THE INVENTION

Field of the invention

This invention relates to a process for producing metallic silver deposits on surfaces of bodies. As a preferred embodiment, this invention relates to a process for producing silver deposits on the surfaces of porous refractory catalyst supports to prepare supported silver catalysts.

Brief description of the drawing

This invention will be further described below with reference to the accompanying drawing wherein.

The prior art

Figure 1:
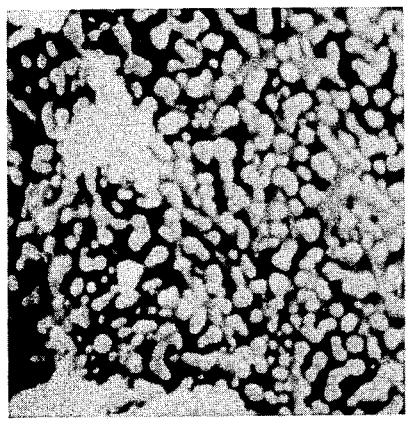
FIGS. 1 and 2 are electron photomicrographs illustrating the novel physical form of silver deposits produced in accordance with this invention.

Silver is a useful, but expensive, metal. A variety of techniques have been developed for the depositing of relatively small amounts of silver on surfaces of non-silver bodies. Some techniques, such as electroplating, are useful to deposit silver in a continuous form, undistinguishable from the bulk state. Techniques are also known for depositing silver on surfaces in an essentially particulate form. McKim and Cambron in Canadian Journal of Research vol. 27, sec. B (1949), number 11, pp. 813–827, employ the following method for depositing particulate silver: fine particles of silver oxalate are precipitated in water and thermally decomposed to a fine powder of metallic silver. A paste is then formed from this metallic powder and a binder and applied to the surface. A variation of this technique is disclosed in U.S. Pat. 3,043,854, issued July 10, 1962, to Endler. In this process, a fine precipitate of silver carbonate is formed and applied as a slurry to a catalyst support surface. After drying, the silver carbonate is thermally decomposed to fine particles of silver. These processes are useful when a coating of small (less than 1 micron, i.e., less than 10,000 A.) silver particles are desired. They do, however, have the disadvantage of not effectively evenly covering the inner surfaces of complex or porous structures. Also, silver particles produced by these processes are not firmly attached to the surface being coated.

Another process for forming particulate silver on the surfaces of objects involves coating the surfaces with a solution of silver nitrate, drying, and then treating the surfaces with hydrogen at elevated temperaratures. This process does form an even distribution of particles of silver which are tightly bonded to the surfaces. It has the disadvantage of invariably forming relatively large silver particles (greater than 1 micron and generally 3 microns or larger).

It would be of advantage to provide a process which will make possible the uniform deposition of silver on both inner and exterior surfaces of objects in the form of tightly adherent particles having a diameter of less than 1 micron.

STATEMENT OF THE INVENTION

It has now been found that silver deposits are produced on the surfaces of a body in the form of uniformly spaced, essentially uniformly sized adherent hemispherical particles having an average diameter of less than 1 micron by the process of coating the surfaces with an aqueous solution of a silver salt of a carboxylic acid and at least one of certain selected organic amine silver solubilizing/reducing agents and then heating to dry the coating and to reduce the silver salt to metallic silver.

In a most preferred application and embodiment of the invention, adherent, less than 1 micron-diameter, hemispherical particles of silver are uniformly produced on the exterior and pore surfaces of an inert porous catalyst support by coating these surfaces with an aqueous solution of silver oxalate and an amine-containing solubilizing/reducing agent selected from the group of ethylenediamine, mixtures of ethylenediamine and ethanolamine, mixtures of ammonia and ethylenediamine, and mixtures of ammonia and ethanolamine; and then drying and decomposing the silver oxalate to elemental silver with heat.

DETAILED DESCRIPTION OF THE INVENTION

The silver salt solution

The silver salt solution employed in the process of this invention consists essentially of:

(A) a silver salt of a carboxylic acid,
(B) an organic amine solubilizing/reducing agent, and
(C) an aqueous solvent.

Suitable silver salts include silver carbonate and the silver salts of mono- and polybasic carboxylic and hydroxycarboxylic acids of up to about 16 carbon atoms. Preferred silver salts of carboxylic acids are the silver salts of mono-, di- and tribasic aliphatic and aromatic carboxylic and hydroxyboxylic acids of from 1 to 8 carbon atoms. Examples of these preferred silver salts are silver carbonate, silver formate, silver acetate, silver propionate, silver oxalate, silver malonate, silver phthalate, silver succinate, silver lactate, silver citrate, and silver tartrate. Silver carbonate and silver oxalate are particularly useful silver salts, with silver oxalate being most preferred.

An organic amine solubilizing/reducing agent must be present in the silver salt solution. Ammonia, while well known for its formation of water-soluble complexes with difficultly soluble silver salts, such as silver oxalate, is not suitable when employed alone. In the absence of organic amine, ammonia gives a deposit of large oblong particles of silver rather than the less than 1 micron deposits of the invention. Suitable organic amine silver-solubilizing/reducing agents include lower alkylenediamines of from 1 to 5 carbon atoms, mixtures of a lower alkanolamine of from 1 to 5 carbon atoms with a lower alkylenediamine of from 1 to 5 carbon atoms, as well as mixtures of ammonia with lower alkanolamines or lower alkylenediamines of from 1 to 5 carbons. Four groups of organic amine solubilizing/reducing agents are preferred. They are the following:

(a) Vicinal alkylenediamines of from 2 to 4 carbon atoms, for example, ethylenediamine (diaminoethane), 1,2 - diaminopropane, 1,2- and 2,3-diaminobutane and 1,2 - diamino - 2 - methylpropane;

(b) mixtures of (1) vicinal alkanolamines of from 2 to 4 carbon atoms, for example, ethanolamine (1-amino-2-hydroxyethane), 1 - amino - 2 - hydroxypropane, 2-amino - 1 - hydroxypropane, 1 - amino - 2 - hydroxy-, 2 - amino - 1 - hydroxy- and 2 - amino - 3 - hydroxybutane, and (2) vicinal alkylenediamines of from 2 to 4 carbon atoms;

(c) Mixtures of vicinal alkylenediamines of from 2 to 4 carbon atoms as defined above and ammonia; and (d) Mixtures of vicinal alkanolamines of from 2 to 4 carbon atoms as defined above and ammonia. These preferred solubilizing/reducing agents are generally added in the amount of from 0.1 to 10 moles per mole of silver present.

Very preferred as solubilizing/reducing agents are:

(a) ethylenediamine,
(b) ethylenediamine in combination with ethanolamine,
(c) ethylenediamine in combination with ammonia, and
(d) ethanolamine in combination with ammonia.

Ethylenediamine in combination with ethanolamine is most preferred.

When ethylenediamine is used as the sole solubilizing/reducing agent, it is necessary to add amounts of the amine in the range of from 0.1 to 5.0 moles (preferably 0.2 to 4.0 moles) of ethylene diamine per mole of silver. It is most preferred to add from 0.3 to 3.0 moles of ethylenediamine for each mole of silver.

When ethylenediamine and ethanolamine together are used as solubilizing/reducing agent, it is suitable to employ from 0.1 to 3 moles of ethylenediamine per mole of silver and from 0.1 to 2 moles of ethanolamine per mole of silver. It is preferred to use from 0.5 to 2.5 moles of ethylenediamine per mole of silver and from 0.3 to 1.0 moles of ethanolamine per mole of silver.

When ethylenediamine or ethanolamine is used with ammonia, it is generally useful to add at least about two moles of ammonia per mole of silver and very suitable to add from about 2 to about 10 moles of ammonia per mole of silver and preferred to add from 2 to 6 moles of ammonia per mole of silver. The amount of ethylenediamine or ethanolamine employed is suitably from 0.1 to 2 moles per mole of silver and preferably from 0.2 to 1 mole per mole. Particular preference for the ethylenediamine/ethanolamine combination results from the potential hazard of solutions containing silver salts and concentrated ammonia.

The solvent employed in the silver salt solution is water. Other materials, such as lower alkanol, alkylpolyols, or ketones may, if desired, be added in minor amounts to the water solvent, but are not required.

The concentration of silver salt in the solution is in the range of from about 0.1% by weight to the maximum permitted by the solubility of the particular salt/solubilizing agent combination employed. It is generally very suitable to employ silver salt solutions containing from 0.5 to about 45% by weight of silver with silver salt concentrations of from 5 to 25% by weight being preferred.

The coating process

The surfaces to be coated with silver are first covered with the silver salt solution by conventional procedures. When exterior surfaces are being coated, spraying, dipping and like processes are suitable. When interior and exterior surfaces of complex or porous objects such as catalyst supports are being coated, soaking the object in the solution to saturate it is very suitable. This soaking (impregnation) technique gives a rapid coating of even the finest pores of a porous catalyst support if vacuum is applied to the support before it is introduced into the solution and then released after the support is immersed.

The coated object is then separated from excess silver salt solution by such steps as decantation, sieving, shaking, and the like.

The coated (impregnated) object is heated at a temperature of from 100° to 375°, preferably from 125° to 325° C., for the time, typically 2 to 8 hours, required to decompose the silver salt and form the adherent particulate deposit of metallic silver on the surfaces. Lower temperatures do not adequately decompose the silver salt and should be avoided. More than one temperature may be employed. The wet, coated object may first be heated for up to six hours at a lower temperature, for example, from 100° to 175° C. and thereafter heated for up to six hours at higher temperatures such as 200° to 325° C. to dry the coating and subsequently produce the silver deposits.

Characteristics of the silver deposited

Silver is deposited in a unique physical form by the process of this invention. Examination of surfaces of objects treated by this invention using scanning electron microscopy indicate that the silver is present as discontinuous, substantially uniformly spaced, discrete, substantially hemispherical particles having uniform diameters of less than 10,000 A. (1 micron). X-ray diffraction studies and surface area measurements have confirmed that the silver is present in this form. Physical tests, such as determination of abrasion loss, have shown that the silver particles adhere tightly to the surface treated. These silver particles are uniformly distributed as discrete 1,000–10,000 A. particles regardless of the amount of silver employed. The silver particles are evenly deposited on both the exterior and the interior surfaces of the objects. When porous catalyst supports are treated by this process an even silver deposit is achieved on the exterior and the pore surfaces. The unique form of the silver deposited with the invention is demonstrated in the figures.

Figure 2:
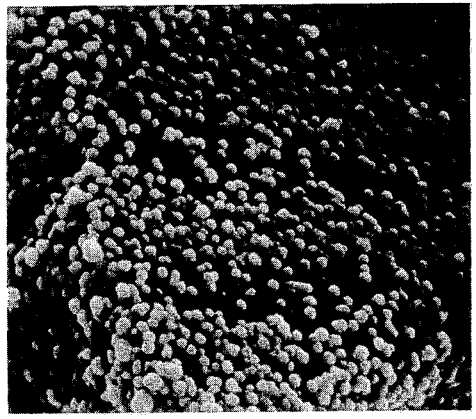
Figure 3:
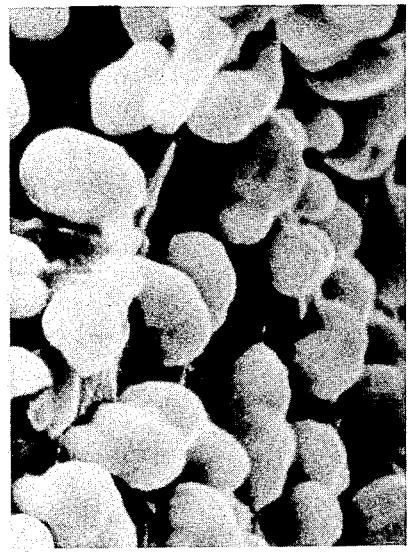
FIGS. 3 and 4, provided for comparison, are electron photomicrographs of silver deposits not in accordance with this invention.
Figure 4:
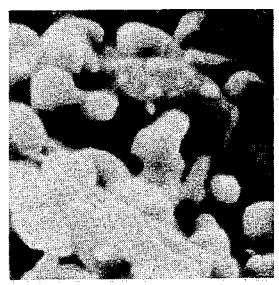

FIGS. 1 and 2 are electron photomicrographs of pore surfaces of refractory catalysts produced in accordance with this invention showing the size and discontinuous discrete nature of the substantially hemispherical regularly spaced 1,000–10,000 A. particles which make up the silver deposit. In contrast, FIG. 3 is an electron photomicrograph of a surface of supported silver catalyst not produced according to the invention. FIG. 3 shows a commercial supported silver catalyst prepared by silver nitrate impregnation followed by hydrogen reduction and having its silver deposit in the form of large (10,000 to 30,000 A.) elongated particles. FIG. 4, likewise illustrates a catalyst not in accordance with this invention, prepared without the required organic amine-solubilizing/reducing agent.

Surfaces which usefully may be treated by the process of this invention

The process of this invention finds application in a variety of fields. It may be used to evenly deposit fine adherent particles of silver on surfaces of semiconducting materials to permit better electrical contact thereto. Because of the fine silver particle size it gives, it also may be used in the production of electrical microcircuits. In a preferred application, this process is used for the production of silver deposits on porous bodies, especially for the production of supported silver catalysts. Supported silver catalysts find application in a number of chemical reactions including hydrogenation, cracking, dehydrogenation, the production of ketones and aldehydes from primary and secondary alcohols and especially the production of ethylene oxide by the direct partial oxidation of ethylene.

When preparing a supported silver catalyst for ethylene oxidation by the process of this invention, the support upon which the discrete silver particles are deposited in its broadest aspects can be selected from the large number of conventional porous refractory catalyst carriers or support materials. Such conventional support materials may be of natural or synthetic origin and preferably are of macroporous structure, that is, having a surface area below about 10 m./g. and preferably from about 0.02 m.$^2$/g. to about 3 m.$^2$/g. and apparent porosity of greater than 20%. The support material is preferably shaped as particles, chunks, pieces, pellets, rings, spheres, and the like of a size suitable for employment in fixed bed applications. Suitable supports comprise those of siliceous and/or aluminous compositions. Specific examples of suitable supports are the aluminum oxides, including the materials sold under the trade name "Alundum," charcoal, pumice, magnesia, kieselguhr, fuller's earth, silicon carbide, porous agglomerates comprising silicon and/or silicon carbide, selected clays, artificial and natural zeolites, metal oxide gel-type materials comprisng oxides of heavy metals such as chromium, molybdenum, tungsten and the like, ceramics, etc. Refractory supports particularly useful in the preparation of silver ethylene oxidation catalysts with this invention comprise the aluminous materials, in particular alpha-alumina. In the case of alpha-alumina supports, preference is given to those having a surface area of from about 0.03 m.$^2$/g. to about 1.5 m./g. and a specific pore volume as measured by conventional mercury absorption techniques of from about 0.22 to about 0.28 cc. per gram. Most preferred supports for ethylene oxide catalysts prepared using this invention are alpha-aluminas having surface areas in the range of from 0.2 m.$^2$/g. to 1 m.$^2$/g. and having median pore diameters of from 1 to 15 microns.

When preparing a silver catalyst for ethylene oxidation, from about 0.5 to about 15% by weight of silver should be applied.

The invention will be further described with reference to the following examples. These are for illustrative purposes and are not to be construed as limitations on the invention.

EXAMPLE I

Silver was deposited on the exterior and pore surfaces of three catalyst supports by the process of this invention to prepare Catalysts A, B and C. The support for Catalyst A was in the form of hollow cylinders (rings) 5/16 inch in diameter by 5/16 inch long of an aluminum oxide containing over 99.3% by weight alpha-alumina, 0.4% by weight of silica and 0.3% by weight of other metal oxides (Norton Company's "Alundum" grade LA-956). It has a surface area of 0.17 m.$^2$/g. as determined by the BET Method using Krypton as adsorbate and an apparent porosity of 40–44% by volume as determined by water absorption.

Support for Catalyst B was hollow cylinders of higher surface area, higher porosity alpha-alumina which also contained 99.3% by weight alpha-alumina, 0.4% silica, and 0.3% of other metal oxides (Norton Company's "Alundum" grade LA-5556). The support for Catalyst B had a surface area of 0.24 m.$^2$/g. and an apparent porosity of 48–49% by volume.

The support for Catalyst C was 5/16 inch diameter by 5/16 inch long rings of a commercial aluminum oxide (Norton Company's "Alundum" grade SA 101), having a surface area of 0.06 m.$^2$/g. and an apparent porosity of 38 to 47% by volume. This support contained 90.4% by weight alpha-alumina, 8.5% by weight silica and 1.1% by weight of other metal oxides.

These supports were impregnated with an organic amine-containing aqueous solution of silver oxalate which was prepared as follows: an aqueous solution of reagent grade silver nitrate was mixed with stirring with an aqueous solution of reagent grade potassium oxalate. Silver oxalate precipitate was collected and washed five times with deionized water. This silver oxalate was then dissolved in concentrated aqueous ammonia (about 30% by weight NH$_3$) to form a 1.43 molar solution of

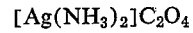

$$[Ag(NH_3)_2]C_2O_4$$

Ten percent by volume of ethanolamine (about 0.5 mole of ethanolamine per mole of silver) was then added to complete the solubilizing/reducing agent combination. The three catalyst supports were impregnated with this silver solution to coat the interior and exterior surfaces, vacuum being applied to ensure complete saturation. Excess liquid was drained off and the supports were immediately placed in a forced air oven at 100° C. The oven temperature was periodically raised, eventually to a maximum of 275° C. Total heating time was about 4 hours. The silver content of Catalyst A was 6.1% by weight; of Catalyst B, 7.8% by weight; of Catalyst C, 7.2% by weight.

The silver deposits on the catalyst supports were examined by electron microscope. The silver deposit of Catalyst A was in the form of discrete particles having a uniform diameter of from 0.2 to 0.4 micron (2000 to 4000 A.). These particles were uniformly spaced on the interior and exterior of the support.

The silver deposit of Catalyst B was in the form of discrete particles having a uniform diameter of from 0.1 to 0.3 micron (1000 to 3000 A.). These particles were uniformly spaced on the interior and exterior surfaces of the support. The average silver particle size was about 0.25 micron (2500 A.).

FIG. 1 is an electron photomicrograph of the silver deposit on an interior surface of Catalyst C. The silver particles of this deposit range in diameter from 0.2 to 0.5 micron (i.e., 2000 to 5000 A.). The particles are discontinuous and uniformly spaced. They are substantially hemispherical. Samples of these catalysts were repeatedly dropped and shaken, and the amount of silver knocked off and lost was then determined. These tests showed that the particles of silver were tightly bound to the support surfaces.

EXAMPLE II

A series of productions of silver deposits was conducted using a variety of silver salts of carboxylic acids and a variety of organic amine solubilizing/reducing agents as starting reagents. The silver was deposited on the surfaces of porous refractory inorganic oxide bodies.

(A) Silver carbonate was dissolved in aqueous ethylene diamine to produce a solution which was 4.5 molar in silver with a 1.2 to 1 molar ratio of ethylenediamine to silver. Monoethanolamine was added in a ratio of 0.4 mole per mole of silver, which diluted the silver concentration to about 4.0 molar. The solution prepared above was used to impregnate a quantity of 5/16 inch rings of Norton Company's grade LA-5556 "Alundum" catalyst support composed of 99% alpha-alumina with an apparent porosity of 49.8% Vacuum was used to ensure complete penetration of the solution into all pores. After impregnation the rings were drained of excess solution. The drained rings were placed in a forced air oven at 125° C. for two hours, after which the temperature was raised to 275° C. and held there for an additional 4 hours.

(B) Silver was deposited on the surfaces of a Norton type LA-5556 porous catalyst support using silver lactate as silver salt and the solubilizing/reducing agent of part A and the general technique of part A.

(C) Silver was deposited on the surfaces of a Norton type LA-5556 porous catalyst support using silver acetate as the silver salt and the solubilizing/reducing agent of part A and the general technique of part A.

(D) Silver was deposited on the surfaces of a Norton type LA-5556 porous catalyst support using silver glycinate as the silver salt and the solubilizing/reducing agent of part A, and the general technique of part A.

(E) Silver was deposited on the surfaces of a Norton type LA-5556 porous catalyst support using silver citrate as the silver salt and the solubilizing/reducing agent of part A, and the general technique of part A.

(F) Silver was deposited on the surfaces of a Norton type LA-5556 porous support with specific pore volume .25 cc./g. using silver oxalate as silver salt and ethylenediamine/ethanolamine as solubilizing/reducing agent. Silver oxalate, prepared as in Example I, was dissolved in water containing 4.2 moles per liter of ethylendiamine (EN) to form a 2.05 molar solution of $(Ag_2EN) C_2O_4$. 10% Ethanolamine was added to this solution just prior to use. The support surfaces were coated with this solution using vacuum. The excess solution was shaken off and the coated support was placed in a forced air oven at 125° C. The temperature of the oven was gradually raised over a period of 4 hours to 250° C. to decompose the silver salt complex and form metallic silver.

(G) The preparation of Example I was repeated using the same concentration of dissolved silver with ammonia and 10% v. ethylenediamine as solubilizing/reducing agent.

(H) The preparation of part F of this example was repeated using ethylendiamine alone as solubilizing/reducing agent. Silver oxalate was dissolved in water containing 4.0 moles per liter of ethylenediamine to form a 1.84 M solution of $(Ag_2EN)C_2O_4$. This solution was then used in accordance with part F.

(I) The preparation of part F of this example was repeated using a more dilute solution of silver. A 1.45 M solution of $(Ag_2EN)C_2O_4$ was prepared and 10% v. of ethanolamine was added. This solution was then applied in accordance with part F.

The silver-containing products of parts A-I of this example were examined. They contained the amounts of metallic silver, based on the total composition given in Table I.

TABLE I

| Composition | Silver, percent w. |
|---|---|
| II-A | 7.4 |
| II-B | 10.6 |
| II-C | 5.9 |
| II-D | 5.9 |
| II-E | 7.2 |
| II-F | 7.8 |
| II-G | 7.8 |
| II-H | 7.8 |
| II-I | 5.5 |

The products were examined by scanning electron microscope. They all exhibited the discrete particulate silver deposit characteristic of the process of the invention. The silver particle diameters for certain of these materials are given in Table II.

TABLE II

| Composition | Particle size A. |
|---|---|
| II-A | 2000–4000 |
| II-B | 3000–6000 |
| II-C | 3000–6000 |
| II-D | 2000–6000 |
| II-E | 1000–4000 |
| II-F | 2000–4000 |
| II-G | 3000–8000 |
| II-H | 2000–4000 |
| II-I | 2000–4000 |

FIG. 2 is an electron photomicrograph of the silver deposit prepared in accordance with Example II part F illustrating the characteristic essentially hemispherical even particulate silver deposit.

Comparative Experiment X

The surfaces of the porous refractory support of Catalyst C of Example I (Norton grade SA-101 "Alundum") were coated with metallic silver by a conventional technique. First the support was impregnated with a 53% w. aqueous solution of silver nitrate, then it was dried at 110° C. and treated with 0.6% v. hydrogen at 220° C. for 8 hours and 10% v. hydrogen for 1 hour. The resulting product (product X) containing 11.2% w. silver. Examination of this material by scanning electron microscope, showed that the silver was present as large particles (20,000 to 30,000 A.). An electron photomicrograph of a silver coated surface of such a conventionally coated material is given in FIG. 3.

Comparative Experiments Y and Z

The surfaces of two porous refractory supports were coated using an ammonia-containing solution of silver oxalate which did not contain the necessary organic amine. One support (support Y) was Norton grad SA-101 "Alundum" alumina. The other (support Z) was Norton grade LA-956 "Alundum" alumina. An aqueous solution containing 2.24 moles/liter of silver oxalate and 5.0 moles/liter of ammonia was prepared and applied to the surfaces of the supports. The treated supports were then heated for 4 hours at temperatures increasing from 100 to 275° C. to dry the solutions, decompose the silver salt and reduce the silver to metallic silver. The two materials; (products Y and Z) after heating, contained 9.7% w. and 9.5% w. of silver, respectively. The silver was present as not-discontinuous irregular particles having diameters of at least 10,000 A. An electron photomicrograph of the silver deposit of product Y is given in FIG. 4.

EXAMPLE III

The supported silver products produced in Examples I and II and comparative experiments X, Y and Z were tested as catalysts for the direct partial oxidation of ethylene to ethylene oxide.

In a representative experiment, 5/16 inch rings of product A of Example I were crushed. 3.5 grams of 30/40 mesh particles of crushed catalyst were charged to 0.20 inch diameter micro reaction tube. The catalyst bed was about 5 inches long. A mixture of air and ethylene was passed over the catalyst at the following reaction conditions:

Pressure, p.s.i.g.: 200
Space velocity, hours$^{-1}$ 2360
Feed composition:
    Ethylene, percent M 30.0
    Oxygen, percent M 8.4
    Nitrogen, percent M 31.2
    Argon, percent M 0.4
    Methane, percent M 30.0
Moderator concentration, p.p.m. of equivalent Cl 2

The reaction temperature was adjusted to provide an oxygen conversion of 40%. The selectivity of ethylene oxide was determined. With product A of Example I, a material in accordance with the invention, containing 6.1% by weight silver, a temperature of 218° C. was required to reach a standard oxygen conversion and EO selectivity was 76%.

The temperatures required to reach 40% oxygen conversion and the oxidation selectivity to ethylene oxide using other products of the examples are listed in Table III.

TABLE III

| Product: | Temperature to achieve 40% oxygen conversion, °C. | Selectivity to ethylene oxide, percent |
|---|---|---|
| I A | 218 | 76 |
| I B | 215 | 77 |
| I C | 239 | 72 |
| II A | 208 | 77 |
| II B | 224 | 71 |
| II C | 227 | 75 |
| II D | 210 | 74 |
| II E | 220 | 75 |
| II F | 205 | 77 |
| II G | 243 | 75 |
| II H | 208 | 76 |
| II I | 209 | 75 |
| X | 258 | 69 |
| Y | 251 | 71 |
| Z | 244 | 72 |

These results indicate that silver deposited in accordance with this invention is not only catalytically active but is in fact superior in ethylene oxidation catalysis to silver deposited by conventional techniques.

I claim as my invention:

1. The process of chemically producing uniformly spaced, adherent, hemispherical deposits of metallic silver having a uniform diameter of not greater than one micron on the surfaces of a body which comprises coating the surfaces of the body with an aqueous solution containing a silver salt of a carboxylic acid and a silver-solubilizing/reducing agent selected from the group of (a) lower alkylenediamines of from 1 to 5 carbon atoms, (b) mixtures of lower alkanolamines of from 1 to 5 carbon atoms and lower alkylenediamines of from 1 to 5 carbon atoms, and (c) mixtures of ammonia and lower alkylenediamines of from 1 to 5 carbon atoms separating the coated object from excess aqueous solution and heating the coated object at a temperature of from 100° C. to 375° C. for from 2 to 8 hours.

2. The process in accordance with claim 1 wherein the aqueous solution contains from 0.5 to 45% by weight of a silver salt selected from the group consisting of silver salts of mono- and dibasic carboxylic and hydrocarboxylic acids of from 1 to 8 carbon atoms and from 0.1 to 10 moles per mole of silver of a silver-solubilizing/reducing agent selected from the group consisting of (a) vicinal alkylenediamine of from 2 to 4 carbon atoms, (b) mixtures of vicinal alkanolamines of from 2 to 4 carbon atoms and vicinal alkylenediamines of from 2 to 4 carbons, and (c) mixtures of ammonia and vicinal alkylenediamines of from 2 to 4 carbon atoms.

3. The process of preparing a supported silver catalyst article having its silver present as discontinuous, substantially uniformly spaced, discrete, substantially hemispherical particles having uniform diameters of less than 10,000 A. which consists essentially of impregnating a porous refractory catalyst support with an aqueous impregnating solution consisting essentially of water, from 0.5 to 45% by weight of a silver salt selected from the group consisting of silver salts of mono- and dibasic carboxylic and hydroxycarboxylic acids of from 1 to 8 carbon atoms, and from 0.1 to 10 moles per mole of silver of a silver solubilizing/reducing agent selected from the group consisting of (a) vicinal alkylenediamines of from 2 to 4 carbon atoms, (b) mixtures of vicinal alkanolamines of from 2 to 4 carbon atoms and vicinal alkylenediamines of from 2 to 4 carbons, and (c) mixtures of ammonia and vicinal alkylenediamines of from 2 to 4 carbon atoms; separating the impregnated support from excess impregnating solution and heating the impregnated support at a temperature of from 125° C. to 325° C. for from 2 to 8 hours.

4. The process in accordance with claim 3 wherein the silver solubilizing/reducing agent is selected from the group consisting of (a) ethylenediamine, (b) mixtures of ethylenediamine and ethanolamine, and (c) mixtures of ethylenediamine and ammonia.

5. The process in accordance with claim 4 wherein the porous refractory catalyst support is an alpha-alumina support having a surface area of from about 0.03 m.$^2$/g. to about 1.5 m.$^2$/g.

6. The process in accordance with claim 5 wherein the silver salt is silver oxalate or silver carbonate and the silver solubilizing/reducing agent is ethylenediamine present in amount of from 0.1 to 5.0 moles per mole of silver.

7. The process in accordance with claim 6 wherein the silver salt is silver oxalate in amount of from 5 to 25% by weight.

8. The process of preparing an alpha alumina-supported silver catalyst article having its silver present as discontinuous, substantially uniformly spaced, discrete, substantially hemispherical particles having uniform diameters of less than 10,000 A., which consists essentially of impregnating an alpha alumina support having a surface area of from 0.2 m.$^2$/g. to 1.0 m.$^2$/g. with an aqueous impregnating solution consisting essentially of water, from 5 to 25% by weight of a silver salt selected from the group consisting of silver oxalate and silver carbonate, ethylenediamine in an amount of from 0.5 to 2.5 moles per mole of silver and ethanolamine in an amount of from 0.1 to 2 moles per mole of silver; separating the impregnated support from excess impregnating solution and heating the impregnated support at a temperature of from 125° C. to 325° C. for from 2 to 8 hours.

9. The process in accordance with claim 8 wherein the silver salt is silver oxalate.

10. The process of preparing an alpha alumina-supported silver catalyst article having its silver present as discontinuous, substantially uniformly spaced, discrete, substantially hemispherical particles having uniform diameters of less than 10,000 A., which consists essentially of impregnating an alpha-alumina support having a surface area of from 0.2 m.$^2$/g. to 1.0 m.$^2$/g. with an aqueous impregnating solution consisting essentially of water, from 0.5 to 45% by weight of a silver salt selected from the group consisting of silver salts of mono- and dibasic carboxylic and hydroxycarboxylic acids of from 1 to 8 carbon atoms, and from 0.1 to 10 moles per mole of silver of a mixture of ethylenediamine and ethanolamine; separating the impregnated support from excess impregnating solution and heating the impregnated support at a temperature of from 125° C. to 325° C. for from 2 to 8 hours.

References Cited

UNITED STATES PATENTS

| 3,147,154 | 9/1964 | Cole et al. | 117—160 R |
| 3,563,914 | 2/1971 | Wattimena | 252—463 |
| 2,773,844 | 12/1956 | Carlson et al. | 117—123 B |

FOREIGN PATENTS

| 1,170,663 | 11/1969 | Great Britain | 252—463 |

WILLIAM D. MARTIN, Primary Examiner

D. L. COHEN, Assistant Examiner

U.S. Cl. X.R.

117—123 B, 160 R; 252—463